United States Patent
Hornstein et al.

(10) Patent No.: US 11,415,935 B2
(45) Date of Patent: Aug. 16, 2022

(54) SYSTEM AND METHOD FOR HOLOGRAPHIC COMMUNICATION

(71) Applicant: Looking Glass Factory, Inc., Brooklyn, NY (US)

(72) Inventors: Alexis Hornstein, Brooklyn, NY (US); Shawn Michael Frayne, Brooklyn, NY (US)

(73) Assignee: Looking Glass Factory, Inc., Brooklyn, NY (US)

( * ) Notice: Subject to any disclaimer, the term of this patent is extended or adjusted under 35 U.S.C. 154(b) by 0 days.

(21) Appl. No.: 17/356,129

(22) Filed: Jun. 23, 2021

(65) Prior Publication Data

US 2021/0397126 A1 Dec. 23, 2021

Related U.S. Application Data

(60) Provisional application No. 63/042,862, filed on Jun. 23, 2020.

(51) Int. Cl.
*G03H 1/08* (2006.01)
*G03H 1/00* (2006.01)

(52) U.S. Cl.
CPC ......... *G03H 1/0005* (2013.01); *G03H 1/0866* (2013.01); *G03H 2001/0088* (2013.01)

(58) Field of Classification Search
CPC .. G03H 1/0005; G03H 1/0866; G03H 1/0443; G03H 2001/0088; G06F 3/0425; G06F 3/012; G06F 3/013; G06F 3/011; G06F 3/017; G06T 19/006; G06T 3/0006; A63F 2300/69; A63F 2300/1093; G02B 27/01; G02B 27/017; G02B 27/0093; G02B 27/0172; G02B 2027/0138; G02B 2027/014; G02B 2027/0174; G02B 2027/0187; H04N 13/225; H04N 13/2256; H04N 13/366–383; H04N 13/243; H04N 21/44218; H04N 21/4223; H04N 21/21805; H04N 21/4666; H04N 5/247; H04N 5/2252; H04N 7/181
(Continued)

(56) References Cited

U.S. PATENT DOCUMENTS 2,631,496 A 3/1953 Rehorn
5,264,964 A 11/1993 Faris
(Continued)

FOREIGN PATENT DOCUMENTS

CN 103852819 A 6/2014
CN 106125322 A 11/2016
(Continued)

OTHER PUBLICATIONS

"ELFSR1 Spatial Reality Display", https://electronics.sony.com/spatial-reality-display/p/elfsr1.
(Continued)

*Primary Examiner* — Stephone B Allen
*Assistant Examiner* — Jyotsna V Dabbi
(74) *Attorney, Agent, or Firm* — Jeffrey Schox; Randy Mehlenbacher

(57) ABSTRACT

A holographic communication system and method can include: determining a user parameter for one or more users, generating a set of views based on the user parameter, and displaying the set of generated views.

18 Claims, 7 Drawing Sheets

(58) Field of Classification Search
USPC .......................................................... 359/9
See application file for complete search history.

(56) References Cited

U.S. PATENT DOCUMENTS

| | | | |
|---|---|---|---|
| 5,521,724 A | 5/1996 | Shires |
| 5,629,798 A | 5/1997 | Gaudreau |
| 5,875,055 A | 2/1999 | Morishima et al. |
| 5,886,675 A | 3/1999 | Aye et al. |
| 6,064,424 A | 5/2000 | Van et al. |
| 6,097,394 A | 8/2000 | Levoy et al. |
| 6,195,184 B1 | 2/2001 | Chao et al. |
| 6,304,288 B1 | 10/2001 | Hamagishi |
| 6,462,871 B1 | 10/2002 | Morishima |
| 6,798,390 B1 | 9/2004 | Sudo et al. |
| 7,190,518 B1 | 3/2007 | Kleinberger et al. |
| 7,705,935 B2 | 4/2010 | Gaudreau |
| 7,903,332 B2 | 3/2011 | De et al. |
| 7,916,934 B2 | 3/2011 | Vetro et al. |
| 8,213,082 B2 | 7/2012 | Gaides et al. |
| 8,248,694 B2 | 8/2012 | Sugiyama |
| 8,416,276 B2 | 4/2013 | Kroll et al. |
| 8,760,566 B2 | 6/2014 | Pitts et al. |
| 8,798,387 B2 | 8/2014 | Yamada et al. |
| 8,995,785 B2 | 3/2015 | Knight et al. |
| 9,060,158 B2 | 6/2015 | Shibagami |
| 9,165,401 B1 | 10/2015 | Kim et al. |
| 9,179,126 B2 | 11/2015 | El-Ghoroury et al. |
| 9,307,228 B2 | 4/2016 | Chen et al. |
| 9,456,141 B2 | 9/2016 | Fishman et al. |
| 9,479,767 B2 | 10/2016 | Van Der Horst |
| 9,486,386 B2 | 11/2016 | Bathiche et al. |
| 9,530,195 B2 | 12/2016 | Ng |
| 9,581,821 B2 | 2/2017 | McDowall et al. |
| 9,584,797 B2 | 2/2017 | Hyde et al. |
| 9,609,212 B2 | 3/2017 | Takenaka et al. |
| 9,654,768 B2 | 5/2017 | Qin et al. |
| 9,686,535 B2 | 6/2017 | Hamagishi et al. |
| 9,704,220 B1 | 7/2017 | Bakar et al. |
| 9,916,517 B2 | 3/2018 | Raghoebardajal et al. |
| 9,977,248 B1 | 5/2018 | Xie |
| 10,129,524 B2 | 11/2018 | Ng et al. |
| 10,152,154 B2 | 12/2018 | Chen |
| 10,521,952 B2 | 12/2019 | Ackerson et al. |
| 10,551,913 B2 | 2/2020 | McCombe et al. |
| 10,853,625 B2 | 12/2020 | McCombe et al. |
| 10,904,479 B2 | 1/2021 | Karafin et al. |
| 10,924,817 B2 | 2/2021 | Defaria et al. |
| 10,948,648 B2 | 3/2021 | Ihas et al. |
| 11,048,101 B2 | 6/2021 | Macnamara et al. |
| 11,119,353 B2 | 9/2021 | Blum |
| 2002/0141635 A1 | 10/2002 | Swift et al. |
| 2004/0165262 A1 | 8/2004 | Alejo |
| 2005/0078370 A1 | 4/2005 | Nishihara et al. |
| 2005/0089212 A1 | 4/2005 | Mashitani et al. |
| 2005/0117016 A1 | 6/2005 | Surman |
| 2006/0061651 A1 | 3/2006 | Tetterington |
| 2006/0191177 A1 | 8/2006 | Engel |
| 2007/0091058 A1 | 4/2007 | Nam et al. |
| 2007/0164950 A1 | 7/2007 | Tajiri |
| 2007/0165145 A1 | 7/2007 | Sugiyama |
| 2008/0043095 A1 | 2/2008 | Vetro et al. |
| 2008/0187305 A1 | 8/2008 | Raskar et al. |
| 2009/0224646 A1 | 9/2009 | Kim et al. |
| 2010/0201790 A1 | 8/2010 | Son et al. |
| 2010/0302351 A1 | 12/2010 | Yanamoto |
| 2011/0032346 A1 | 2/2011 | Kleinberger |
| 2011/0075257 A1 | 3/2011 | Hua et al. |
| 2011/0102558 A1 | 5/2011 | Moliton et al. |
| 2011/0193863 A1 | 8/2011 | Gremse et al. |
| 2011/0292190 A1 | 12/2011 | Kim et al. |
| 2011/0316987 A1 | 12/2011 | Komoriya et al. |
| 2012/0281922 A1 | 11/2012 | Yamada et al. |
| 2012/0313896 A1 | 12/2012 | Noda |
| 2013/0088486 A1 | 4/2013 | Yoon et al. |
| 2013/0147790 A1 | 6/2013 | Hildreth et al. |
| 2013/0242051 A1 | 9/2013 | Balogh |
| 2013/0257861 A1 | 10/2013 | Kim et al. |
| 2013/0307948 A1 | 11/2013 | Odake et al. |
| 2013/0321581 A1 | 12/2013 | El-Ghoroury et al. |
| 2014/0118511 A1 | 5/2014 | Hyde et al. |
| 2014/0267584 A1 | 9/2014 | Atzpadin et al. |
| 2014/0320614 A1 | 10/2014 | Gaudreau |
| 2014/0334745 A1 | 11/2014 | Fleischer et al. |
| 2014/0347454 A1 | 11/2014 | Qin et al. |
| 2015/0022887 A1 | 1/2015 | Larson et al. |
| 2015/0249817 A1 | 9/2015 | Roelen et al. |
| 2016/0021365 A1 | 1/2016 | Effendi et al. |
| 2016/0101013 A1 | 4/2016 | Bathiche et al. |
| 2016/0105658 A1 | 4/2016 | Choo et al. |
| 2016/0234487 A1 | 8/2016 | Kroon et al. |
| 2016/0313842 A1 | 10/2016 | Pacheco et al. |
| 2017/0041596 A1 | 2/2017 | Park et al. |
| 2017/0078577 A1 | 3/2017 | Wakamatsu |
| 2017/0078650 A1 | 3/2017 | Frayne et al. |
| 2017/0102671 A1 | 4/2017 | Damm et al. |
| 2017/0139213 A1 | 5/2017 | Schmidtlin |
| 2017/0208292 A1* | 7/2017 | Smits .................. G01S 3/00 |
| 2017/0244948 A1 | 8/2017 | Pang et al. |
| 2017/0295357 A1 | 10/2017 | Yang |
| 2017/0347083 A1 | 11/2017 | Grossmann |
| 2018/0020204 A1 | 1/2018 | Pang et al. |
| 2018/0035096 A1 | 2/2018 | Gemayel |
| 2018/0035134 A1 | 2/2018 | Pang et al. |
| 2018/0084245 A1 | 3/2018 | Lapstun |
| 2018/0089903 A1 | 3/2018 | Pang et al. |
| 2018/0097867 A1 | 4/2018 | Pang et al. |
| 2019/0018247 A1 | 1/2019 | Gao et al. |
| 2019/0035125 A1* | 1/2019 | Bellows .................. G02B 27/01 |
| 2019/0049899 A1 | 2/2019 | Gelman et al. |
| 2019/0057957 A1 | 2/2019 | Xie |
| 2019/0088004 A1 | 3/2019 | Lucas et al. |
| 2019/0222821 A1 | 7/2019 | Graziosi et al. |
| 2019/0226830 A1 | 7/2019 | Edwin et al. |
| 2019/0244432 A1 | 8/2019 | Simonsen |
| 2019/0388193 A1 | 12/2019 | Saphier et al. |
| 2019/0388194 A1 | 12/2019 | Atiya et al. |
| 2020/0228881 A1 | 7/2020 | Defaria et al. |
| 2020/0266252 A1* | 8/2020 | Cancel Olmo .......... H04N 5/89 |
| 2020/0296327 A1 | 9/2020 | Karafin et al. |
| 2020/0314415 A1 | 10/2020 | Karafin et al. |
| 2020/0384371 A1 | 12/2020 | Karafin et al. |
| 2021/0044795 A1 | 2/2021 | Karafin et al. |
| 2021/0060405 A1 | 3/2021 | Karafin et al. |
| 2021/0132693 A1 | 5/2021 | Pulli et al. |
| 2021/0165212 A1 | 6/2021 | Christmas |

FOREIGN PATENT DOCUMENTS

| | | | |
|---|---|---|---|
| DE | 102009009443 B3 | 9/2010 | |
| EP | 3454098 A1 | 3/2019 | |
| JP | 3096613 B2 | 12/1996 | |
| JP | 2010068202 A | 3/2010 | |
| KR | 20140111553 A | 9/2014 | |
| WO | 9827451 A1 | 6/1998 | |
| WO | 2006015562 A1 | 2/2006 | |
| WO | WO-2015104239 A2 * | 7/2015 | ........... G03H 1/2286 |
| WO | WO-2018227098 A1 * | 12/2018 | ............. G06F 3/011 |

OTHER PUBLICATIONS

International Search Report and the Written Opinion, Application No. PCT/US19/015235, dated Apr. 4, 2019.
"Nanostructured Moth-Eye Anti-Reflective Coating", Synopsys, https://www.synopsys.com/photonic-solutions/product-applications/rsoft-optimization-nanostructured-moth-eye.html.
"Privacy Screens for Laptops, Computers & Monitors", Pinterest, https://in.pinterest.com/pin/656892295631728414/.
"We developed the World's Most Advanced 3D Display Technology", https://www.dimenco.eu.
An, Jungkwuen, et al., "Slim-panel holographic video display", Nature Communications vol. 11, Article No. 5568 (2020), published Nov. 10, 2020.

(56) References Cited

OTHER PUBLICATIONS

Broxton, Michael, et al., "Immersive Light Field Video with a Layered Mesh Representation", SIGGRAPH 2020 Technical Paper.
Chen, Renjie, et al., "Wide field view compressive light field display using a multilayer architecture and tracked viewers", Journal of the SID 22/10, 2015, pp. 525-534.
Dodgson, Neil Anthony, "Variation and extrema of human interpupillary distance", Proceedings of SPIE—The International Society for Optical Engineering, 5291:36-46, Jan. 2004.
Dong, Yan-Yu, et al., "P-68: Dual-Side Floating Autosteroscopic 3D Display Based on Micro-Prism Array and Lenticular Sheet", SID Symposium Digest of Technical Paper / vol. 47, Issue 1, May 25, 3016.
Geng, Jason, "Three-dimensional display technologies", IEEE Intelligent Transportation System Society, Advances in Optics and Photonics 5, 456-535 (2013) received May 28, 2013.
Gotsch, Dan, et al., "TeleHuman2: A Cylindrical Light Field Teleconferencing System for Life-size 3D Human Telepresence", CHI 2018, Apr. 21-26, 2018, Montreal, QC, Canada.
Hayashi, Akinori, et al., "A 23-in. full-panel-resolution autostereoscopic LCD with a novel directional backlight system", Journal of the Society for Information Display 18(7), Jul. 2010.
Holliman, Nick, "3D Display Systems", Science Laboratories, Feb. 2, 2005.
Huzaifa, Muhammad, et al., "Exploring Extended Reality with ILLIXR: A New Playground for Architecture Research", arXiv:2004.04643v2, Mar. 3, 2021.
Jung, Sung-Min, et al., "High image quality 3D displays with polarizer glasses based on active retarder technology", Proceedings of SPIE—The International Society for Optical Engineering, vol. 7863, Feb. 2011.
Kim, Kibum, et al., "TeleHum: Effects of 3D Perspective on Gaze and Pose Estimation with a Life-size Cylindrical Telepresence Pod", CHI 2021, May 5-10, 2021, Austin, Texas, USA.
Kleinberger, Paul, et al., "A full-time, full-resolution dual stereoscopic/autostereoscopic display OR Rock Solid 3D on a flat screen—with glasses or without!", Conference: Electronic Imaging 2003, Proceedings of SPIE—The International Society for Optical Engineering, May 2003.
Levoy, Marc, et al., "Light Field Rendering", ACM-0-89791-746-4/96/008, 1996.
McAllister, David Franklin, "Display Technology: Stereo & 3D Display Technologies", Department of Computer Science, North Carolina State University, Mar. 2003.
Peterka, Tom, et al., "Advances in the Dynallax Solid-State Dynamic Parallax Barrier Autostereoscopic Visualization Display System", IEEE Transactions on Visualization and Computer Graphics 14(3):487-99, May 2008.
Stolle, Hagen, et al., "Technical solutions for a full-resolution autostereoscopic 2D/3D display technology", Proceedings of SPIE—The International Society for Optical Engineering, Mar. 2008.
Vertegaal, Roel, "Real Reality Interfaces with Interactive Light Field Displays", IMID 2018 Digest.
Wang, Yuedi, et al., "Three-dimensional light-field display with enhanced horizontal viewing angle by introducing a new lenticular lens array", Optics Communications 477 (2020) 126327, received May 12, 2020.
Zhang, Xujing, et al., "LightBee: A Self-Levitating Light Field Display for Hologrammatic Telepresence", CHI 2019, May 4-9, 2019, Glasgow, Scotland, UK.
"Deep Frame The World's Largest Mixed Reality Display Technology", https://www.realfiction.com/solutions/deepframe.
"The (New) Stanford Light Field Archive, Computer Graphics Laboratory, Stanford University", http://lightfield.stanford.edu/acq.html#array.
Shi, Liang, et al., "Towards real-time photorealistic 3D holography with deep neural networks", Nature, vol. 591, Mar. 11, 2021.
Urey, Hakan, et al., "State of the art in stereoscopic and autostereoscopic displays", Proceedings of the IEEE, IEEE. New York, US, vol. 99, No. 4, Apr. 1, 2011 (Apr. 1, 2011), pp. 540-555. XP011363625, ISSN: 0018-9219, DOI: 10.1109/JPROC. 2010.2098351.
Yang, Jason C., et al., "A Real-Time Distributed Light Field Camera", Eurographics Workshop on Rendering (2002), pp. 1-10.
Balough, Tibor, et al., "Real-time 3D light field transmission", Proceedings of SPIE—The International Society for Optical Engineering, Apr. 2010.
Brar, Rajwinder Singh, et al., "Laser-Based Head-Tracked 3D Display Research", Journal of display technology, IEEE Service center, NY, US, vol. 6, No. 10, Oct. 1, 2010, pp. 531-543, XP011308937, ISSN: 1551-319X.
Cserkaszky, Aron, et al., "Light-Field Capture and Display Systems: limitations, challenges, and potentials", https://researchgate.net/publication/327285597, Conference Paper, Aug. 2018.
Goode, Lauren, "Google's Project Starline Videoconference Tech Wants to Turn You Into a Hologram", Wired, https://www.wired.com/story/google-project-starline/, May 18, 2021.
Kim, Kyung-Jin, et al., "Holographic augmented reality based on three-dimensional volumetric imaging for a photorealistic scene", Optics Express, vol. 28, No. 24 / 23, Nov. 2020.
Kovacs, Peter Tamas, et al., "Architectures and Codecs for Real-Time Light Field Streaming", Journal of Imaging Science and Technology, Jan. 2017.
Kovacs, Peter Tamas, "Light-Field Displays: Technology and Representation of 3D Visual information", Holografika, JPEG PLENO Workshop, Warsaw, Poland, Jun. 23, 2015.
Li, Hengjia, et al., "Perspective-consistent multifocus multiview 3D reconstruction of small objects", arXiv:1912.03005v1, Dec. 6, 2019.
Liou, Jian-Chiun, et al., "Dynamic LED backlight 2D/3D switchable autostereoscopic multi-view display", Journal of display technology, IEEE Service center, NY, US, vol. 10, No. 8, Aug. 1, 2014, pp. 629-634, XP011551837, ISSN: 1551-319X, DOI: 10.1109/JDT.2014.2307691.
Matusik, Wojciech, et al., "3D TV: A Scalable System for Real-Time Acquisition, Transmission, and Autostereoscopic Display of Dynamic Scenes", https://citeseerx.ist.psu.edu/viewdoc/download?doi=10.1.1.9.8587&rep=rep1&type=pdf.
Saw, John, "T-Mobile 5G Powers Immersive Experiences with Augmented Reality and Holographic Telepresence", https://www.t-mobile.com/news/network/t-mobile-5g-powers-immersive-experiences-with-augmented-reality-and-holographic-telepresence, Mar. 1, 2021.

* cited by examiner

SYSTEM AND METHOD FOR HOLOGRAPHIC COMMUNICATION

CROSS-REFERENCE TO RELATED APPLICATIONS

This application claims the benefit of U.S. Provisional Application No. 63/042,862, filed 23 Jun. 2020, which is incorporated in its entirety by this reference.

TECHNICAL FIELD

This invention relates generally to the communications field, and more specifically to a new and useful system and method in the communications field.

BACKGROUND

Image displays are an integral part of modern life. From televisions to monitors to smartphone and tablet screens, image displays provide users with the ability to view and interact with information presented in a variety of forms.

The advent of three-dimensional displays has enabled users to experience images with higher realism than would be possible with their two-dimensional counterparts. However, the image sizes can be prohibitively large making real or near-real time 3D image display challenging.

Thus, there is a need in the communications field to create a new and useful system and method. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
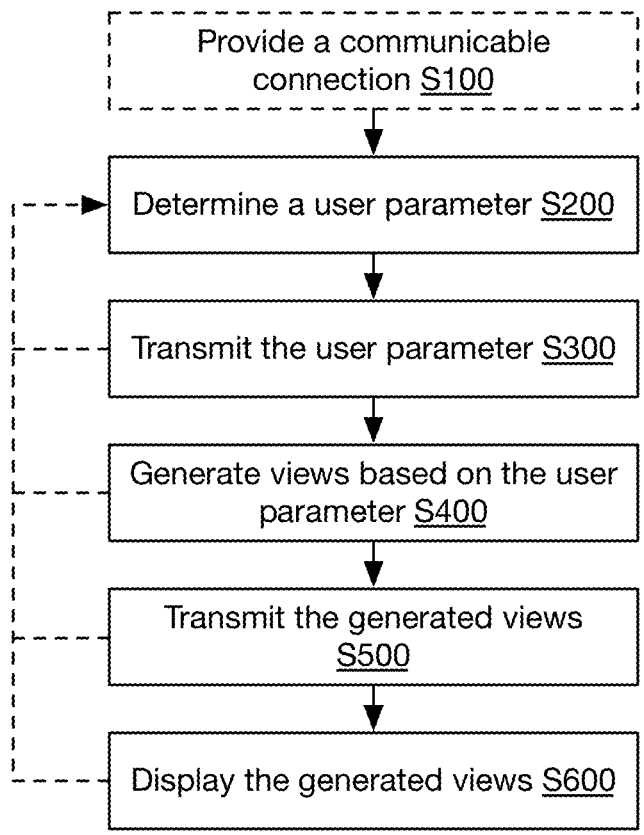
FIG. 2 is a schematic representation of an example of a communications method.

As shown in FIG. 2, the method can include determining one or more user parameters S200, transmitting the user parameter S300, generating views based on the user parameter(s) S400, transmitting the generated views S500, and displaying the received views S600. The method can optionally include providing a communicable link S100. However, the method can any suitable steps.

Figure 1:
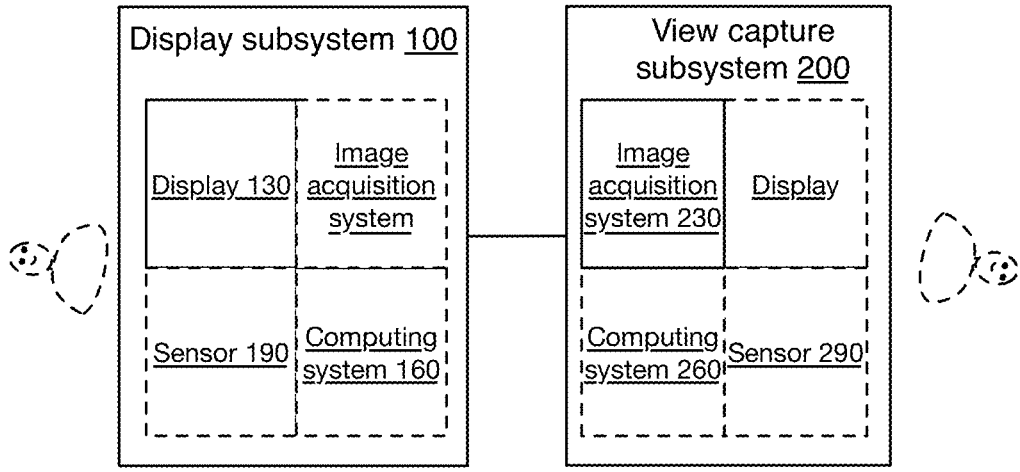
FIG. 1 is a schematic representation of an example of a communications system.

As shown in FIG. 1, a communication system can include a display subsystem 100 and an image capture subsystem 200. The display subsystem can include a lightfield display 130, a computing system 160, one or more sensors 190, and/or any component. The image capture subsystem can include an image acquisition system 230, a computing system 260, and/or any component.

The method and system preferably function to capture and display lightfield images in real or near-real time. A lightfield image can be a still image, a frame of a light field video, and/or be any suitable image. The method and system can be particularly beneficial for providing visual (and audio) communication between two or more users (e.g., in different locations), and enable unidirectional, bidirectional, and/or multi-directional communication (e.g., between N communication endpoints). However, the method and system can additionally or alternatively be used to generate and display for photography, security, video monitoring, and/or for any application. The method and system preferably capture and display the lightfield images at a frame rate of at least 30 frames per second, but can capture and display the lightfield images at any suitable frame rate.

Furthermore, multiple users can concurrently view images sent by different endpoints on the same lightfield display. In examples, a first and second user can concurrently communicate with a first and second remote endpoint, respectively, using the same lightfield display.

2. Benefits

Variations of the technology can confer several benefits and/or advantages.

First, variants of the technology can enable real and/or near-real time capture and display of lightfield images (also referred to as holographic images, hologrammatic image, three dimensional image, etc.), for example by decreasing the bandwidth requirements for transferring the lightfield image, decreasing the processing requirements for transferring the lightfield image, and/or otherwise increase the speed of and/or decrease the processing necessary to capture or display lightfield images. In a specific example, generating and/or transmitting only views based on a user parameter can greatly decrease (e.g., by a factor of 2×, 4×, 10×, 40×, 100×, etc.) the processing power necessary to generate, transmit, and display the lightfield images.

Second variants of the technology can display lightfield images that have few or no visual artifacts. For example, the lightfield images can avoid visual artifacts resulting from shadows (e.g., the appearance of holes in a face, loss of information, etc.), from accessories (such as the perception of glasses that are molded to a person's face), from scene features (e.g., facial hair, transparent materials in the scene, etc.), and/or from other sources. In specific examples, the technology can minimize the presence of artifacts by representing the lightfield image using a set of images (e.g., as opposed to generating a mesh or other three dimensional representation of the subject of the lightfield image).

However, variants of the technology can confer any other suitable benefits and/or advantages.

3. System

As shown in FIG. 1, a communication system 10 can include a display subsystem 100 and an image capture subsystem 200. The display subsystem 100 can include a lightfield display 130, a computing system 160, one or more sensors 190, and/or any component. The image capture subsystem 200 can include an image acquisition system 230, a computing system 260, one or more sensors 290, and/or any component. Each capture and/or viewing endpoint can include one or more communication systems or components thereof. For example, to enable two directional communication, each end point can include a display subsystem and an image capture subsystem. In a second example, such as to provide unidirectional communication (e.g., for security or monitoring), one endpoint can include a display subsystem and another endpoint can include an image capture subsystem.

The display subsystem and the image capture subsystem can be associated with (e.g., proximal to, collocated with, in use by, etc.) the same user and/or with different users. In an illustrative example, a display subsystem can be associated with one or more viewers (e.g., receivers) and an image capture subsystem can be associated with one or more viewers (e.g., senders). In a second illustrative example, a display subsystem can be associated with one or more viewers (e.g., receivers) and an image capture subsystem can be associated with a scene and/or location (e.g., one that does not necessarily include any sender(s), one that periodically includes sender(s), etc.). The display subsystem and the image capture subsystem are generally arranged in different locations (e.g., different rooms, different states, different countries, etc.), but can be collocated (e.g., within the same room, within a predetermined distance of one another, etc.).

The display subsystem 100 functions to display lightfield images. The display subsystem can additionally or alternatively function to determine one or more user parameters, receive lightfield images, and/or perform any function. The lightfield image is preferably represented by a set of views (e.g., images of the scene such as showing different perspectives, renderings of the scene, processed images, interpolated images, etc.). However, the lightfield image can be represented using a mesh (e.g., polygonal mesh), polygonal representation, curve representation, voxel representation, represented in a format as disclosed in U.S. patent application Ser. No. 17/226,404 filed 9 Apr. 2021 entitled 'SYSTEM AND METHOD FOR GENERATING LIGHT FIELD IMAGES' incorporated in its entirety by this reference, and/or using any suitable representation.

The set of views can include any suitable number of views between 1-1000 views such as 2, 4, 8, 12, 20, 45, 50, 75, 90, 100, 135, and/or 150 images. However, the lightfield image can include greater than 1000 views and/or any suitable number of views.

The display subsystem 100 can include a lightfield display 130, one or more sensors 190, and a computing system (e.g., a display computing system 160), and/or any components.

The lightfield display 130 functions to display the lightfield image. The viewers (e.g., receivers) preferably perceive the lightfield image (e.g., as presented by the display) as a holographic or three dimensional image. However, one or more viewers can additionally or alternatively perceive the lightfield image as two dimensional, 2.5 dimensional, and/or as having any suitable dimensionality. The lightfield display is preferably operable without (e.g., the lightfield images are perceived as three dimensional without using) peripherals (such as head mounted devices, glasses, polarizers, etc.), but can be operable with (e.g., require) peripherals. The lightfield display preferably simultaneously displays each view associated with a lightfield image, but can display any views with any suitable timing. In a specific example, a lightfield display can include one or more: panel, optical element, parallax generator, optical volume, and/or any component. In a second specific example, the display can be and/or include components of a 'superstereoscopic display,' a 'retroreflecting display,' and/or holographic display as disclosed in U.S. patent application Ser. No. 16/374,955 titled 'SUPERSTEREOSCOPIC DISPLAY WITH ENHANCED OFF-ANGLE SEPARATION' filed 4 Apr. 2019, U.S. Pat. No. 10,241,344 titled 'ADVANCED RETROREFLECTING AERIAL DISPLAYS' filed 28 Nov. 2018, U.S. patent application Ser. No. 17/326,857 filed 21 May 2021 titled 'SYSTEM AND METHOD FOR HOLOGRAPHIC IMAGE DISPLAY,' and/or U.S. patent application Ser. No. 17/332,479 filed 27 May 2021 titled 'SYSTEM AND METHOD FOR HOLOGRAPHIC DISPLAYS,' each of which is incorporated in its entirety by this reference.

The sensors 190 function to determine (e.g., measure) and/or track one or more user (or viewer, receiver, sender, etc.) parameter. The sensors can additionally or alternatively function to determine one or more environmental parameter (e.g., property of the viewed scene; property of an environment proximal a receiver, display subsystem, image capture subsystem, etc.; etc.) and/or perform any suitable function. Examples of user parameters can include: user pose, user head pose, user eye pose (e.g., position and/or orientation such as x/y/z/θ/φ/ψ for each of a user's eyes), user eye vector, user gaze direction, kinematics (e.g., user motion), user gestures and/or interactions (such as at an input device), number of users (e.g., viewers, receivers, senders, etc.), intentional sounds (e.g., talking, laughing, verbal communication, etc.), and/or any suitable user parameters. Examples of environmental parameters can include ambient lighting, ambient sounds, and/or any suitable environmental parameter. The sensor(s) preferably function without using markers (e.g., without requiring special glasses and/or targets), but can use (e.g., require) markers. In variants, the sensor(s) can include tracking sensors 195 (e.g., optical sensors such as depth cameras, stereo cameras, interferometry, cameras, etc.; inertial trackers; magnetic trackers; wireless trackers such as using a set of anchors; eye and/or gaze trackers such as eye-attached trackers, optical gaze trackers, electrical potential gaze trackers, etc.; audio trackers such as ultrasonic sensors; etc.), audio sensors (e.g., microphones, speakers, transducers, etc.), lighting sensors, and/or any suitable sensors.

Figure 3:
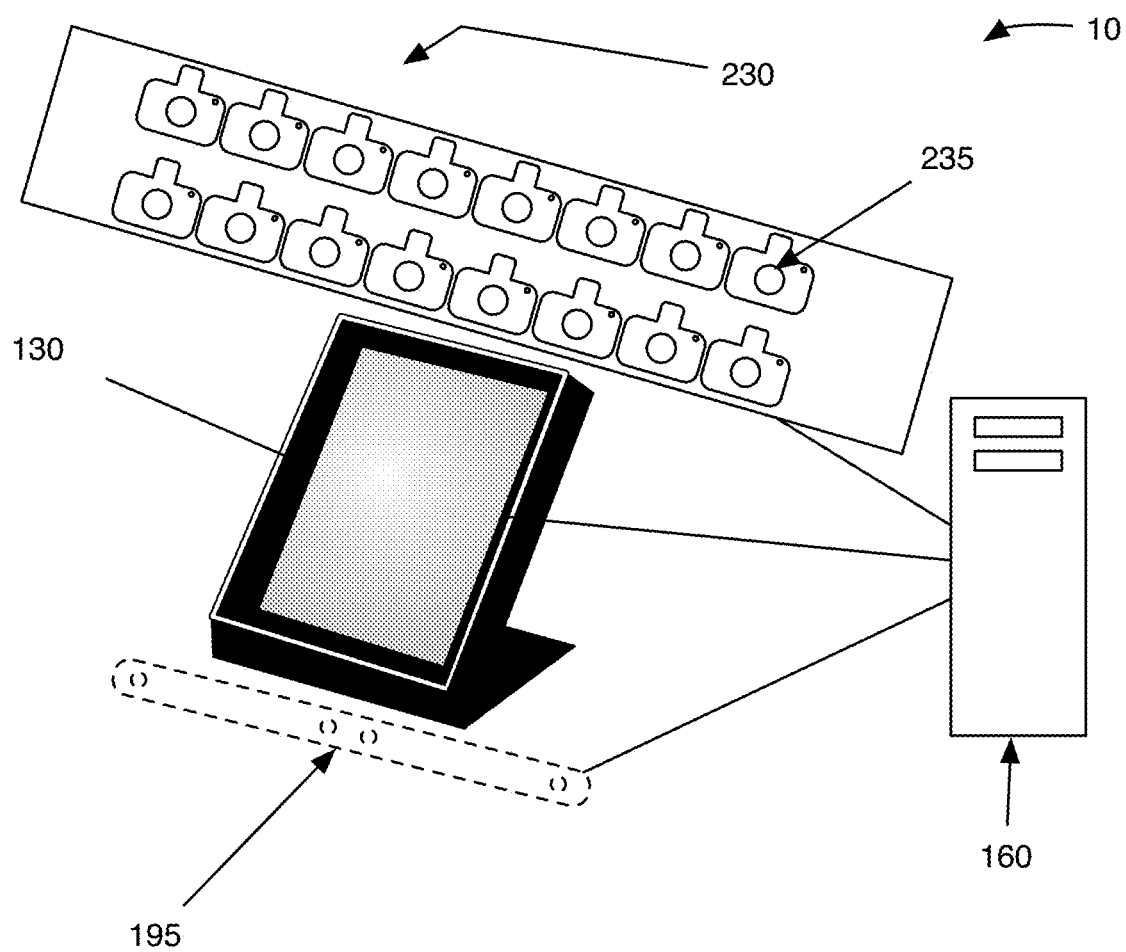
FIG. 3 is a schematic representation of an example of a communications system.

The sensor(s) can be mounted below the lightfield display (e.g., below optical elements of the light field display, as shown for example in FIG. 3, etc.), above the lightfield display (e.g., above optical elements of the lightfield display), next to the lightfield display, and/or have any arrangement relative to the display. However, the sensors can be separate from the lightfield display.

In some embodiments, the sensor can be the same as an image capture subsystem (e.g., the image acquisition system of the image capture subsystem). However, the sensor can alternatively be different from an image capture subsystem. For instance, a communication system can include a depth camera (e.g., a time of flight camera, stereo camera, LIDAR integrated camera, a camera with a processor configured to extract a depth of an image, etc.) that can be used for viewer tracking and a camera array (e.g., with or without a depth sensor) for capturing image or views of a subject.

The image capture subsystem 200 functions to acquire one or more images (e.g., views) of a target proximal the image capture subsystem, generate a lightfield image of the scene, transmit the lightfield image, and/or perform any suitable steps. The target can be an object (e.g., one or more users such as senders, wildlife, plants, inanimate objects, etc.) and/or the scene within the field-of-view of the image capture subsystem. The image capture subsystem can include an image acquisition system 230, a computing system (e.g., a view computing system 260), sensors 290, and/or any suitable components.

The image acquisition system 230 functions to capture images of the target. The image acquisition system is preferably an array of cameras 235 (e.g., a plurality of cameras), but may additionally or alternatively include a camera (e.g., a camera configured to capture images of the target from a plurality of perspectives such as a moveable camera, a camera with an image sensor (e.g., CMOS detector, CCD detector, etc.) arranged to capture images of the target from different perspectives, etc.), a plenoptic camera, a computing system (e.g., that retrieves the images from a storage module, that stores the images in a buffer of a storage module, that renders the images, that generates the views, etc.), and/or be otherwise arranged. The camera frame rate is preferably at least 24 frames per second (e.g., 30 fps, 45 fps, 60 fps, 120 fps, 240 fps, etc.), but can be less than 24 fps and/or any suitable frame rate.

The camera array can be a one-dimensional camera array (e.g., where the image sensor for each camera of the camera array is aligned to a reference axis such as a horizontal reference axis, a vertical reference axis, a straight reference line, a curved reference line, along an edge of a display, etc.), a two dimensional camera array (e.g., where the cameras are arranged on a two-dimensional grid, a rectilinear grid, a curvilinear grid, etc.), a three dimensional camera array (e.g., where the cameras are placed with a predetermined arrangement in three dimensional space; to match a pixel or screen shape such as to define a spherical spatial distribution to match a spherical screen or pixel of a display; etc.), and/or otherwise be arranged. The number of cameras in the camera array can depend on the user parameters (e.g., the number of users; the distance such as an average distance, optimal viewing distance, focal distance, maximal distance, minimal distance, etc. between the user and the display; etc.), an environmental parameter (e.g., a distance of a target from the image capture system, a number of targets, etc.), views (e.g., the number of views that can be displayed, the number of views that need to be displayed for the viewers or receivers to perceive the scene as three dimensional or with predetermined quality, etc.), a camera parameter (e.g., the camera frame rate, the camera resolution, the camera field of view, a stereo-camera baseline, frame rate, image resolution, etc.), a computing system property (e.g., bandwidth of information transfer, processing bandwidth, etc.), and/or depend on any property. The number of cameras can be any value or range thereof between about 1 and 100 cameras; however, the number of cameras can be greater than 100. In an illustrative example, where the target is a user such as for teleconferencing, the camera array can include 8 cameras arranged in a 4×2 array. In a second illustrative example, a camera array can include at least 45 cameras (for example, when a display preferably displays up to 45 views). In a variation of the second example, the camera array can include 45 cameras arranged along a horizontal extent (e.g., in a given row, 45 columns of cameras, etc.) and 2 or more rows of cameras. However, the camera array can include any suitable number of cameras.

Each camera of the camera array can be the same (e.g., same image sensor, same image sensor size, same frame rate, same spectral response, etc.) or different (different image sensors, different image sensor sizes, different frame rates, different spectral response, etc.).

In some embodiments, cameras of the camera array can be separated into camera subsets. For example, the camera array can include primary, secondary, tertiary, and so on cameras. The camera subsets can be fixed and/or varying. Each camera of a camera subset can be the same or different. Subsets of cameras can be determined based on camera properties (e.g., frame rate, image sensor size, camera perspective, etc.), sensor data (e.g., tracking information, etc.), user parameters, environmental parameters, and/or otherwise be determined. Subsets of cameras can be arranged in a group (e.g., be physically grouped together), be interspersed with other subsets of cameras (e.g., every fourth camera can belong to a camera subset with the remaining cameras belonging to a second camera subset), be randomly distributed, and/or otherwise be distributed or arranged.

In a first variant of the camera array, a subset of the cameras (e.g., secondary cameras) can be used (e.g., used exclusively, used for purposes in addition to acquiring images, etc.) to track a target and/or viewer, segment an image (e.g., a collected image, a image acquired using the same or a different camera or image sensor, etc.), classify an image, and/or otherwise be used. For example, a subset of cameras (e.g., secondary cameras) can be used to segment an image into a foreground and a background. Based on a relative pose between a camera from the subset of cameras (e.g., a secondary camera) and a separate camera (e.g., a primary camera), a foreground and background can be determined for images associated with the separate camera. In this specific example, only the foreground can be transmitted to the receiver. However, the background can additionally or alternatively be transmitted to the receiver.

Figure 8:
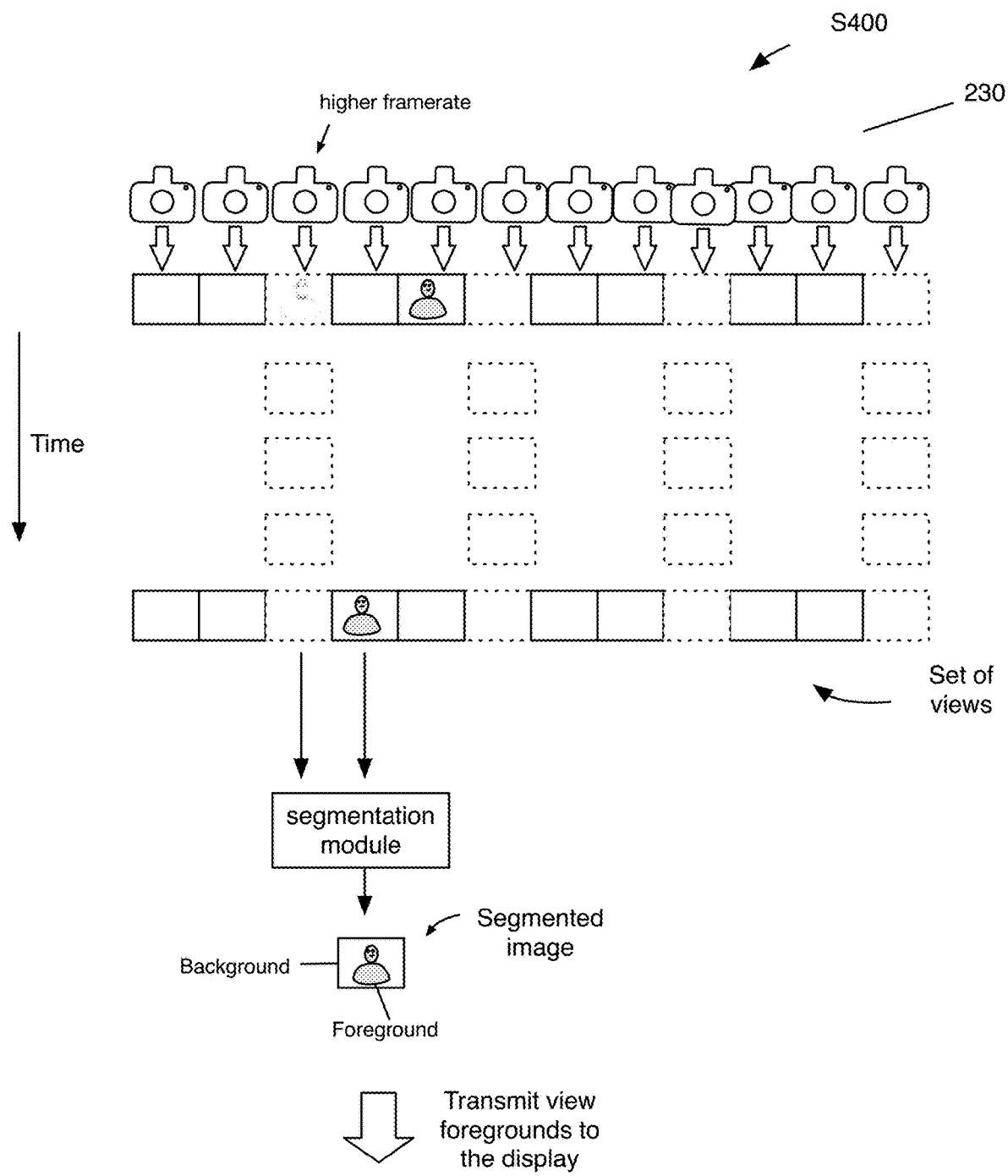
FIG. 8 is a schematic representation of an example of capturing a subset of views at a higher frame rate than other views, segmenting the higher frame rate views into a foreground and background, using the segmentation to segment the remaining views, and transmitting the foreground from the image capture system to the image display system.

As shown for example in FIG. 8, a first set of cameras (e.g., primary cameras, view acquisition cameras) of the camera array can acquire images at a first frame rate (e.g., approximately 30 fps) and a second set of cameras (e.g., secondary cameras, segmentation cameras) of the camera array can acquire images at a second frame rate (e.g., 120 fps) that is greater than the first frame rate. In this specific example, the second set of cameras can acquire images with a lower resolution than the first set of cameras (e.g., at 1080 pp vs 4 k or 8 k resolution for the first set of cameras). However, the second set of cameras can acquire images with an equal or greater resolution (e.g., as a cost savings by including fewer higher quality cameras) and/or any suitable resolution or frame rate. The second set of cameras generally has fewer cameras than the first set of cameras. However, the second set of cameras can have the same number of and/or more cameras than the first set of cameras.

In a second variant of the camera array, a first set of cameras can be determined based on tracking information for a viewer using a display. For example, the first set of cameras can be cameras that are at an equivalent (e.g., nearest to the equivalent; adjacent to; within a threshold distance such as 1 mm, 2 mm, 5 mm, 1 cm, 2 cm, 5 cm, 10 cm, 20 cm, etc. of; etc.) pose as the viewer eye pose (and/or eye vector) were the viewer in approximately the same position as the camera array and/or for a virtual viewer collocated with (or proximal to) the camera array. Alternatively stated, the first set of cameras can be aligned to the position of (e.g., closest to, within a threshold distance or position of, etc.) the viewer(s)' eyes (e.g., as determined via tracking the viewer's eyes). As the viewer moves, the first set of cameras can change. For instance, as a viewer moves in a particular direction (e.g., up, down, left, right), the set of primary cameras can move (e.g., be physically moved, change which cameras are included in the set of primary cameras by selecting cameras that are offset from the initial primary cameras by a distance approximately equal to the distance the viewer moves, etc.) in the same direction (e.g., by approximately the same amount) or opposite direction (e.g., depending on whether the camera array is mirrored or not to viewer direction). In this variant the second set of cameras (e.g., auxiliary cameras) can be one or more cameras adjacent to (e.g., above, below, right, left, behind, in front of, between primary cameras, etc. such as immediately next to, within a threshold number of cameras of, etc.) the first set of cameras, cameras that are not in the first set of cameras, cameras that are not adjacent to the first set of cameras, and/or any suitable cameras of the camera array. The second set of cameras can function to provide auxiliary views such as in anticipation of or to account for motion of a viewer, to provide additional perspectives or views of the target (e.g., sender), and/or otherwise function. In some variations of this variant, the camera array can include a third (or more) set of cameras. For example, cameras adjacent to the second set of cameras, distal the first set of cameras, can form a third set of cameras. Typically images associated with the third set of cameras are not transmitted to the receiver (and/or the third set of cameras can not be used to acquire images), but they can be transmitted. The set of cameras (e.g., primary, secondary, and/or tertiary cameras) can be offset (e.g., vertically offset) relative to the viewers' positions, coincident with the viewers' positions, and/or can have any suitable orientation.

The first and second variants can be used in isolation and/or combination.

The cameras of the camera array are preferably equally spaced, but can be unevenly spaced. The separation distance between adjacent cameras within the camera array is preferably between about 1 inch and 24 inches. However, the separation distance between adjacent cameras can be greater than 24 inches and/or less than 1 inch.

In variants, the camera array can be attached to a lightfield display. The camera array can be mounted above the lightfield display (e.g., above optical elements of the light field display, as shown for example in FIG. 3, etc.), below the lightfield display (e.g., below optical elements of the lightfield display), next to the lightfield display, and/or have any arrangement relative to the display (e.g., a subset of cameras above the display and a subset of cameras below the display, a subset of cameras on a first side of the display and a subset of cameras on a second side of the display, etc.). The camera array and display can be on the same or different faces (e.g., surfaces, broad faces, etc.) of a housing (e.g., can be arranged in a manner similar to a selfie or front facing camera, be arranged in a manner similar to a rear facing camera, etc.). However, the camera array can be attached to (e.g., mounted to) a computing system, sensor, viewer, be separated from other components (e.g., separate from a display), and/or have any suitable arrangement.

The image capture sensors 290 can be the same and/or different from the image capture sensors 190. However, any suitable sensors can be used.

An optional display of an image capture subsystem 200 can be the same or different from a display of a display subsystem 100.

An optional image acquisition system or camera array of a display subsystem 100 can be the same or different from an image acquisition subsystem system 200.

The computing system 300 can function to process views (e.g., compress or decompress views), generate views, select views, control system operation, receive and transmit data (e.g., user parameters, views, environmental parameters, etc.), and/or perform any function. The computing system can be local (e.g., to the lightfield display, to the image acquisition system, to the display subsystem, to the image capture subsystem, to a sensor, etc.), remote (e.g., cloud computing, server, etc.), and/or otherwise be distributed. In a specific example, the computing system can be distributed between a display computing system 160 and an image capture or view computing system 260 (e.g., associated with an image acquisition system). The computing system can include one or more: GPUs, CPUs, TPUs, microprocessors, and/or any other suitable processor.

The communication module 350 functions to communicate user parameters, images (e.g., still frames, videos, timeseries, etc.), and/or other data between communication systems and/or other endpoints. Each system or subsystem can include one or more communication modules. The communication modules can be wireless modules (e.g., WiFi, cellular, satellite, etc.), wired modules (e.g., coaxial cable, fiber, etc.), and/or other communication modules. For example, the communication (e.g., between receiver and sender) can be transmitted over internet, over a cellular network, over a local area network, and/or over any suitable data network.

In some variants, the computing system (e.g., an image capture computing system) can include a multiplexer, which can function to selectively activate (e.g., send instructions to capture image(s) using) specific cameras of the image acquisition system.

4. Method

The method functions to capture lightfield images of a target and display the lightfield images to one or more viewers (e.g., viewers). The method can additionally or alternatively function to enable communication (e.g., telecommunication) between users (e.g., teleconferencing), viewing 3D imagery of a target, and/or any suitable function. The method is preferably performed in real- or near-real time, but additionally or alternatively be delayed (e.g., a light field image or video can be stored for access or viewing later), and/or be performed with any suitable timing.

Figure 4:
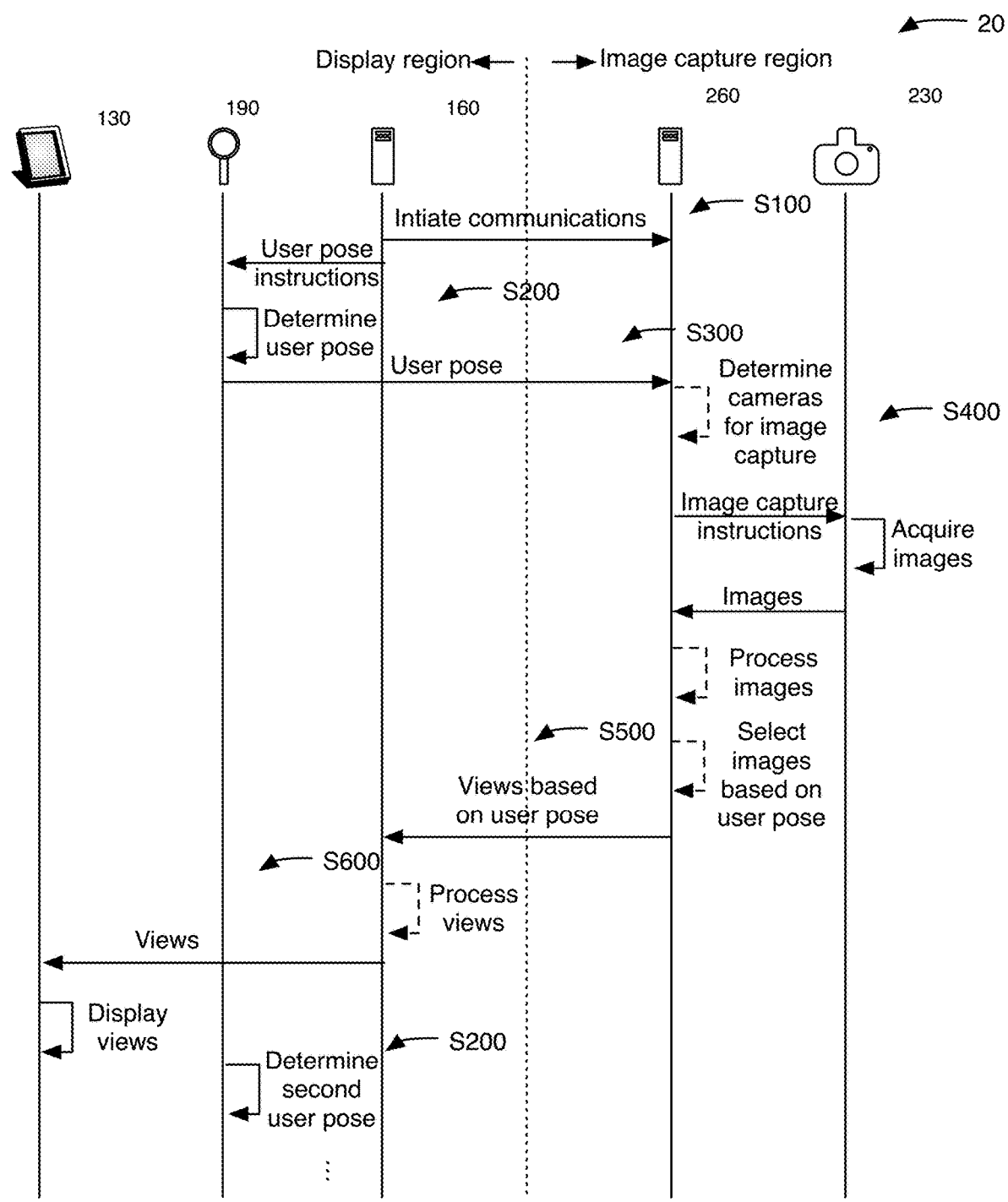
FIG. 4 is a schematic representation of an example flow chart of a method.

As shown for example in FIG. 4, the method can include: establishing a communicable link S100, determining one or more user parameters S200, transmitting the user parameter(s) S300, generating views based on the user parameter(s) S400, transmitting the generated views S500, and displaying the received views S600. The method can optionally include processing (e.g., pre and/or post processing) the views, and/or any suitable steps.

One or more instances of the method (and/or steps thereof) can be performed sequentially, simultaneously, contemporaneously, within a predetermined time period, synchronously, asynchronously, and/or with any timing. In an illustrative example, two instances of the method can be performed contemporaneously for each of two users. The method is preferably performed using a system as described above, but can be performed by any suitable system. In a first specific example, the method can be performed between two communications system where each communication system can include a lightfield display, a tracking sensor, camera array (or other image acquisition system), and a computing system. In a second specific example, the method can be performed using a display subsystem and a separate image capture subsystem.

Establishing a communicable link S100 functions to connect a display subsystem to an image capture subsystem enabling communication (e.g., data, such as images and/or audio, transmission between them). The communicable link can be a network connection, radio, Bluetooth (e.g., BLE), optical communication, wired connection, and/or any suitable data connection can be used. Establishing the communicable link S100 is preferably performed between a display computing system and an image capture computing system (e.g., communication modules of the respective systems), but can be between any suitable components. Establishing the communicable link preferably includes identifying and/or verifying the transmitter and receiver, but can include any suitable steps. The communicable link can be automatically established (e.g., upon entering a communication room, upon requesting information from an image capture subsystem, based on user preferences, upon detection of motion proximal an image acquisition subsystem, etc.) and/or manually (e.g., by accepting an invitation, by accepting a request, by entering a communication room, etc.). The communicable link is preferably wireless (e.g., optical, transmitting data over the internet, etc.), but can be wired.

Determining a user parameter S200 preferably functions to determine (e.g., measure, estimate, calculate, etc.) one or more user parameters associated with a display user or viewer (e.g., a receiver). Determining a user parameter is preferably performed by a sensor (e.g., a tracking sensor, a sensor of a display subsystem, etc.), but can be performed by any component. S200 can be performed before, during, and/or after S200.

In specific examples, user parameters can include: user pose (e.g., of a viewer's head, nose, face, glabella, hairline, etc.), user head pose, user eye pose (e.g., position and/or orientation such as $x/y/z/\theta/\varphi/\psi$ for each of a user's eyes), user gaze direction, user eye vectors, kinematics (e.g., user motion), user gestures and/or interactions (such as at an input device), number of users, a bandwidth (e.g., processing bandwidth, transmission bandwidth, receipt bandwidth, display bandwidth, etc. associated with a computing system associated with the user), and/or any suitable user parameters. In variants where the user parameters include a pose (e.g., head pose, eye pose, gaze, etc.), the pose can refer to an absolute position, relative positions (e.g., relative to the display, a virtual user location such as where the display user would be if they were collocated with the image capture subsystem, relative to the image capture subsystem, etc.), coordinates, one or more camera of a camera array (e.g., a primary camera), and/or be provided in any manner. Additionally or alternatively, the user parameter can include a set of view indices, which function to specify the views requested from the opposing communication system (e.g., which views should be captured and/or transmitted back to the display). The view indices are preferably determined based on the current or estimated user parameter (e.g., user pose, eye pose, etc.), but can be determined based on the viewing target's current or estimated position, calibration matrices (e.g., between the viewing display and the capturing camera system), or the otherwise determined. The view indices can identify the main views corresponding to the user parameter (e.g., the user's position), buffer views (e.g., surrounding the primary views), and/or other views.

In variants (for example, when one or more viewers lose tracking but are still expected or known to be viewing the display), determining a user parameter can include predicting the value for the user parameter. The viewer pose can be estimated: until viewer tracking is redetermined (e.g., sensor can identify a viewer feature or pose), for a predetermined amount of time (e.g., 1 s, 2 s, 4 s, 6 s, 10 s, 20 s, values therebetween, >20 s, <1 s, etc.), at a second time after the user parameter has been measured, and/or for any suitable condition. The user parameter can be predicted based on sensor data (e.g., IMU measurements associated with a user), based on images of the user (e.g., using optic flow), and/or based on any data. The user parameters at the second time can be predicted using a dead reckoning, a Kalman filter, an extended Kalman filter, kinematic equations, a particle filter, and/or be otherwise predicted.

Transmitting the one or more user parameters S300 functions to provide the image capture subsystem with the user parameters. The user parameter(s) are preferably transmitted using the communicable link, but can be transmitted in any manner. The user parameters are preferably transferred from the display subsystem to the image capture subsystem, but can be transferred between any systems. S300 is preferably performed after S200, but can be performed at the same time as and/or before S200 (e.g., estimated user parameters can be transmitted before user parameters have been measured or updated).

Generating one or more views S400 functions to acquire images of a scene and/or target and/or prepare (e.g., process, select, etc.) images to be displayed at a display. The views can correspond to images, processed images, selected images, renderings, and/or other data structures. The views are preferably generated by an image capture subsystem, but can be generated by a computing system (e.g., a memory module of a computing system, a view generation module of a computing system, etc.) and/or by any component. S400 is preferably performed after S300, but can be performed before and/or during S300 (e.g., a set of images can be acquired by the image acquisition system before and/or at the same time as the user parameters are transmitted to the image capture subsystem). The views can be generated based on the user parameters (e.g., as measured in S200, estimated user parameters, measured user parameters, etc.), the communicable link (e.g., a bandwidth, a quality of the connection, a stability of the connection, etc.), a computing system (e.g., a processor bandwidth, a processor speed, a GPU, etc.), and/or any suitable property. The views to be generated can be specified by the requesting system (e.g., viewing system, display subsystem), the image capture system, and/or another system.

In variants, generating one or more views can include: acquiring images, identifying one or more targets, tracking one or more targets (e.g., using a sensor, using based on one or more image acquired using a camera, etc.), adjusting an image capture parameter (e.g., which camera(s) are used to acquire images, which images or views are selected, a frame rate, an image resolution, etc.), selecting images, processing images, and/or any suitable step(s).

Generating views preferably includes acquiring a plurality of images of a target. The images are preferably acquired by the image acquisition system (e.g., camera array, primary cameras of the camera array, primary and secondary cameras of the camera array, secondary cameras of the camera array, etc.). Each image is preferably acquired substantially simultaneously with other images (e.g., within at most 1 ms 10 ms, 20 ms, 100 ms, 1 s, etc. of each other); however, the images can be acquired with any timing.

The focus of the image acquisition system can be set automatically (e.g., based on a and/or manually. Acquiring the plurality of images can include focusing the image acquisition system (e.g., focusing each camera of a camera array) on a target. Each camera is preferably focused on the same target; however, one or more cameras can focus on different targets. However, acquiring the plurality of images can include capturing the images with a predetermined focal point; optionally, determining a target within the images; and adjusting the focal plane of the images (e.g., such that the target is in focus). Determining the target can include segmenting the image (e.g., semantic segmentation, foreground/background segmentation, etc.), classifying the image segments, identifying a target of interest based on the classification (e.g., manually such as the display user identifying the target; automatically such as using a neural network, based on a set of rules, etc.), and tracking the target (e.g., across frames such as using optic flow; between images such as using disparity maps; etc.), and/or any suitable steps. Adjusting the focal plane of the images can include deconvolving the image, determining a depth map associated with the image, applying a blurring filter to the images (e.g., to adjust a lens blur, based on the depth to a target and/or pixel of the image, etc.), generating a 3D reconstruction (e.g., based on the depth map) generating a view using the 3D reconstruction (e.g., by capturing an image of the 3D reconstruction using virtual cameras), and/or any suitable steps. However, a focus of the images can otherwise be determined or set.

Figure 5A:
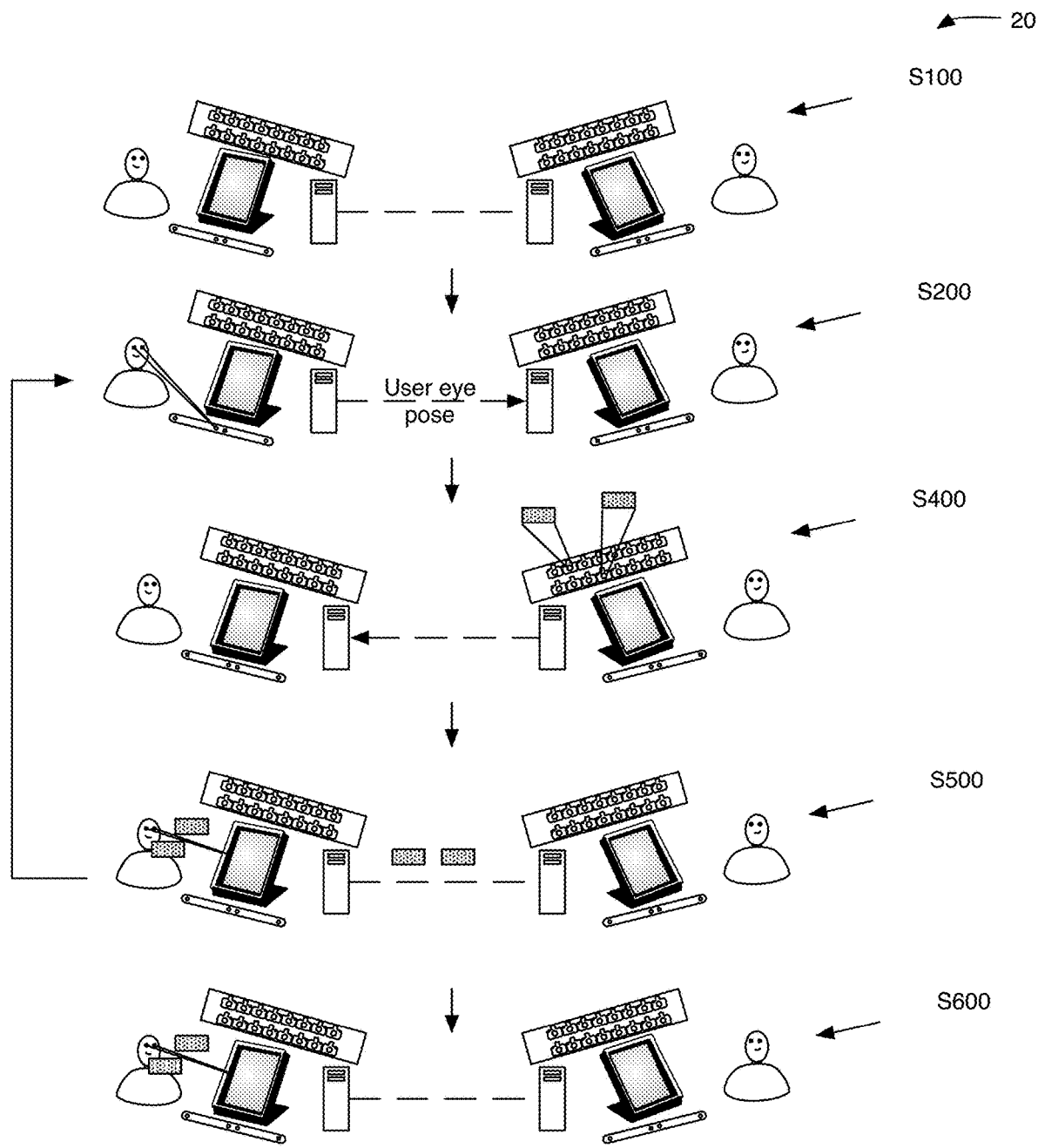
FIGS. 5A and 5B are schematic representations of variants of the method.

In a first embodiment, acquiring a plurality of images can include acquiring a plurality of images using a subset of the camera array. The subset of cameras can include any number of cameras between 1 and the total number of cameras in the camera array such as 2, 3, 4, 8, 10, 15, 20, 25, 30, 40, 45, and/or any number of cameras. In a specific example, the number of cameras in the subset of cameras matches the number of distinct eye poses of display users. In a variation of this specific example, the number of cameras in the subset can include buffer cameras (e.g., two, four, six, etc. buffer cameras per camera matching the distinct eye poses of the display users) adjacent to (e.g., surrounding) the primary cameras. The subset of the camera array is preferably determined based on the display user parameters, but the subset of the camera array can be predetermined (e.g., based on a set-up procedure), based on the target, and/or be otherwise determined. In an illustrative example, as shown in FIG. 5A, the subset of cameras can be chosen to be the cameras that are closest to the eye pose of a virtual user, where the eye pose of the virtual user is determined based on the eye pose measured for the display user. In a related example, the subset of cameras can include the pair of cameras that are closest to the eye pose of the virtual user. In a third specific example, the subset of cameras can correspond to the view indices received from the (viewing) display subsystem. In a second specific example, the cameras in the subset of cameras can correspond to the three or four cameras that are closest each eye pose of a virtual user. In variations of the specific examples, the subset of cameras can include cameras adjacent to the cameras determined based on the eye pose. In a third specific example, the cameras in the subset of cameras can be determined based on a mapping (e.g., equation, look-up table, etc.) from the viewer's eye position (e.g., tracked position) to cameras of the camera array. However the subset of cameras can include any suitable cameras.

Figure 5B:
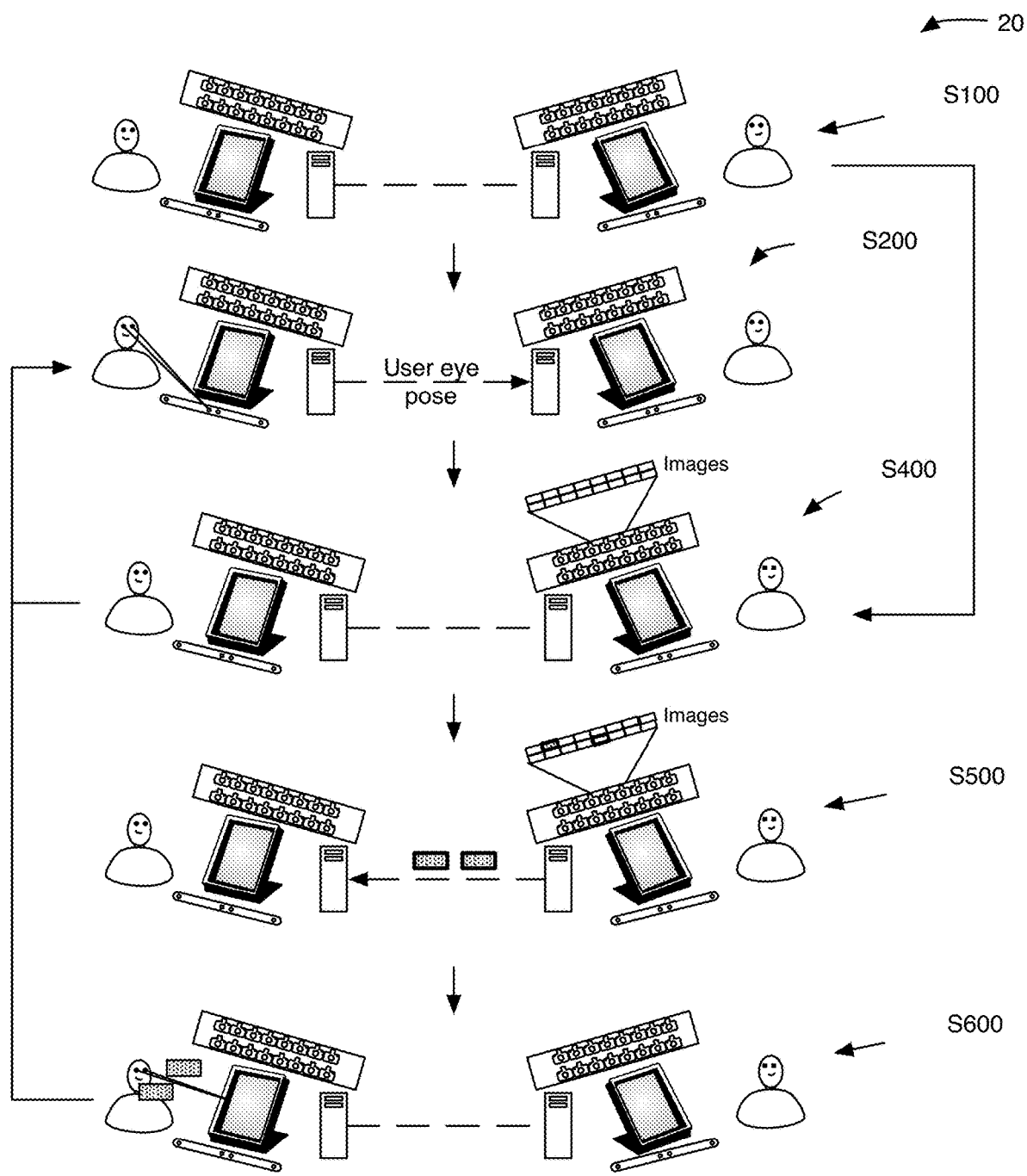

In a second embodiment, acquiring a plurality of images can include acquiring a plurality of images using every camera of the camera array. In this embodiment, a subset of the images is preferably selected from the plurality of images. The subset of images is preferably selected based on the display user parameters (e.g., user pose, view indices), but can be selected based on the target and/or any suitable property. Selected images can include: images associated with primary and/or second cameras, images associated with a subset of cameras, a In an illustrative example as shown in FIG. 5B, the subset of images can be selected based on the eye pose for the display user.

In a third embodiment, acquiring a plurality of images can include acquiring a plurality of images using a camera (or other image recording device), where the camera is translated to a plurality of positions, where the plurality of positions are determined based on (e.g., match) a display user parameter (e.g., eye pose).

Processing the images preferably functions to reduce a size of an image, but can additionally or alternatively function to reduce or remove one or more optical artifact, augment the images (e.g., using digital content), and/or otherwise function. Processing the images can include: cropping images, aligning images, rectifying images, transforming images (e.g., using an affine transformation), filtering images, compressing images, applying a shader, reprojecting the images (e.g., interpolating between images, determining an image intermediate between two or more images, etc.), correcting images (e.g., correcting each image based on a camera pose for the respective camera), generating a quilt image (e.g., arranging the set of images in a predetermined order or manner), and/or any suitable image manipulations.

Figure 6:
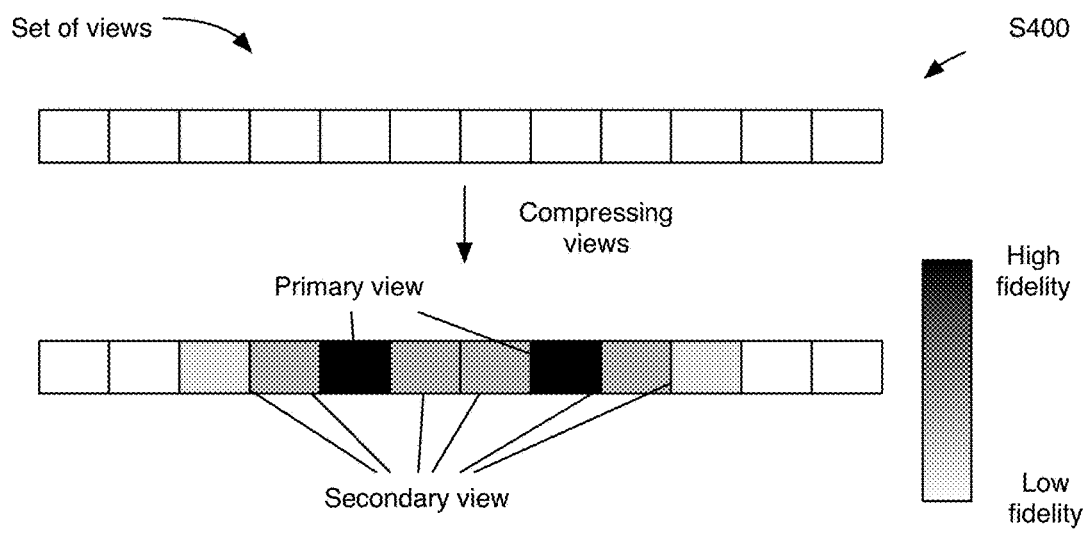
FIG. 6 is a schematic representation of an example of compressing different images with different fidelities.

Each image of the set of images can be processed in the same or different manner. For example, as shown in FIG. 6, a first set of images can be compressed using a first codec and/or set of codex parameters and a second set of images can be compressed using a second codec and/or set of codec parameters. In this example, the first set of images can be associated with primary cameras and can be compressed with a higher quality and/or fidelity (e.g., based on one or more of: objective quality, subjective quality, sharpness, noise, tone reproduction, dynamic range, contrast color accuracy, distortion, vignetting, exposure accuracy, lateral chromatic aberration, lens flare, color moiré, artifacts, etc.) relative to the second set of images (e.g., associated with secondary cameras). However, the first set of images can be compressed with a lower quality and/or fidelity relative to the second set of images, the first and second set of images can be compressed in different file wrappers, and/or the image can otherwise be compressed.

Processing the images preferably does not include rendering the images to generate a three dimensional representation of the target and/or scene. However, the images can be processed to generate a three dimensional representation of the target and/or scene.

In variants, processing the images can include warping a projection matrix which functions to accommodate (e.g., correct for) changes in a user parameter (e.g., head orientation, eye orientation, distance from the display, position relative to the display, etc.). The warped projection matrix (e.g., perspective correct information, perspective projection) is preferably used to determine the views that need to be projected onto the display (e.g., a screen thereof) based on the user's eye position(s), but can be used to determine the images (e.g., additional images) to be captured by the camera array, camera indices (e.g., cameras in addition to the cameras capturing the primary images, secondary cameras, etc.) for additional image capture, and/or otherwise used. The warping can be determined based on measurements from the tracking sensor and/or any suitable component. The warping can be relative to an on-axis viewer perspective, an initial viewer perspective (e.g., initial viewer pose relative to the display, initial viewer eye pose, etc.), and/or relative to any suitable perspective. The projection matrix (e.g., warped projection matrix) can be applied to captured images, interpolated images, perspective corrected images, 3D representation (e.g., mesh), and/or any suitable image or scene representation. In some examples, a plurality of images (e.g., for each eye of the viewer) can be used to generate the perspective corrected image. In a first variation, the projection matrix is used to determine how the images should be processed to determine the projected views. In a second variation, the projection matrix is used to determine which pixels, corresponding to a mesh of the scene (e.g., 2D mesh, 3D mesh, polygonal mesh, etc.), should be rendered. However, the projection matrix can be otherwise used.

In some embodiments, S400 can include segmenting one or more image or view. Segmenting the image(s) can be beneficial as segments or portions of the images can be transmitted (e.g., rather than full images), which can decrease a bandwidth required and/or enable higher resolution images to be transferred. The image(s) can be segmented using artificial intelligence (e.g., machine learning; a neural network such as generative adversarial networks, convolutional neural networks, deep neural networks, etc.; trainable methods; etc.), an image classification and/or segmentation algorithm, using computer vision (e.g., thresholding, clustering, edge detection, histogram methods, region-growing methods, partial differential equations, compression methods, variational methods, graph partitioning methods, watershed transformations, multi-scale segmentation, etc.) and/or using any suitable method(s). The image can be segmented into key points (e.g., as shown for example in FIG. 7), into a foreground and background (e.g., as shown for example in in FIG. 8), into one or more subjects and not subjects, into a target and other information, and/or otherwise be segmented.

Figure 7:
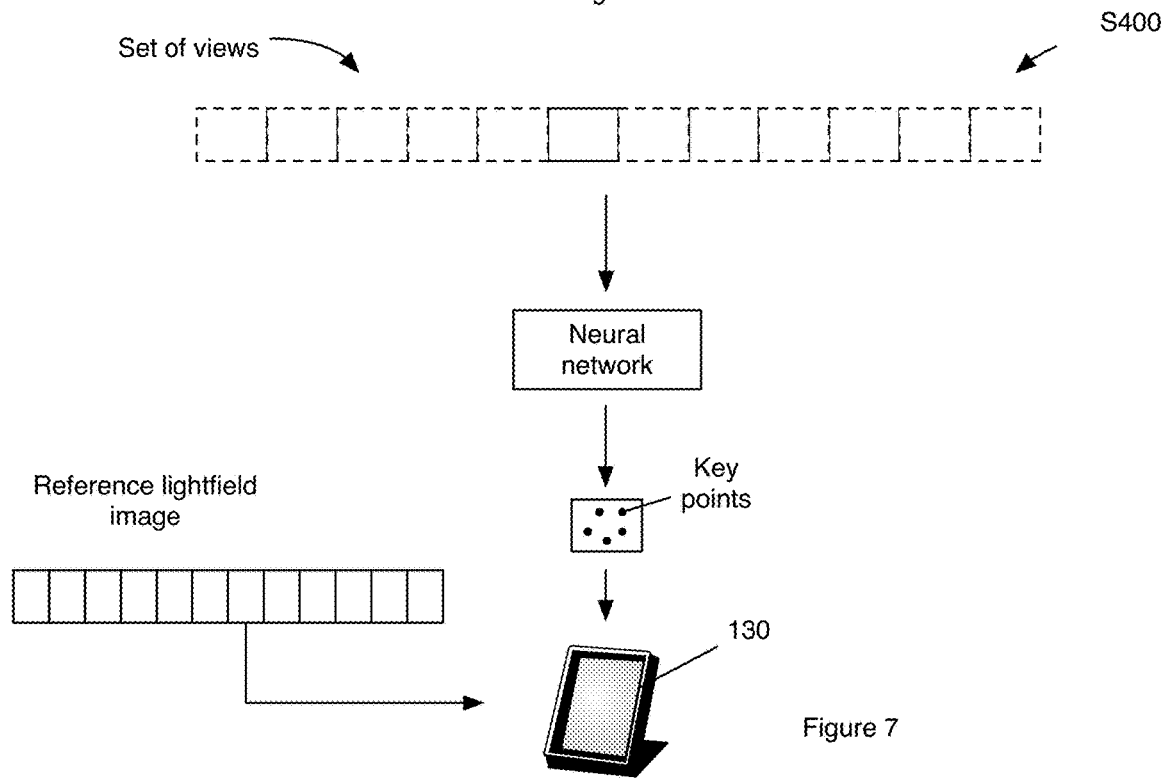
FIG. 7 is a schematic representation of an example of compressing image(s) using machine learning.

In a first variant, one or more images can be segmented into key points. The images can be segmented into key points, for instance as shown in FIG. 7, using a neural network (e.g., a GAN, segmentation network, etc.). The key points can be features, pixels, superpixels, coordinates, and/or other distinctive points within the image(s). The key points can be transmitted to the display subsystem. The key points can be used (e.g., at the display subsystem) to process (e.g., transform, reproject, etc.) a reference image (e.g., based on a change in position of the key points between the reference image and the currently measured key points) to accommodate or display changes or updates to a subject. However, the key points can otherwise be used.

In a second variant, a first subset of the images (e.g., secondary images) can be segmented into a foreground (e.g., the subject such as the sender) and background (e.g., environment or context surrounding the subject). The secondary images are preferably acquired at a higher frame rate than a second subset of images (e.g., primary images such as images that are intended to be transmitted), but can be acquired at the same or a lower frame rate than the primary images. The secondary images can be segmented using machine learning (e.g., a neural network as shown for example in FIG. 8), based on motion (e.g., a difference between the frames), and/or otherwise be segmented. The segments of the secondary images can be used to segment the primary images (e.g., based on a known pose or relationship between the secondary cameras and the primary cameras). However, the images can otherwise be segmented or used.

S400 can include acquiring auxiliary dataset(s). The auxiliary datasets can be acquired simultaneously with, contemporaneously with, before, after, and/or with any suitable timing relative to the images. Examples of auxiliary datasets can include: audio datasets (e.g., subject audio, subject speaking, etc.), depth (e.g., distances between the image acquisition system and the subject(s)), environmental parameters, and/or any suitable auxiliary dataset(s). The auxiliary dataset(s) can be acquired using a sensor, a computing system (e.g., configured to generate an auxiliary dataset), and/or be acquired using any suitable component. In some variants, the auxiliary datasets can be processed, for example, to change a perceived audio by a receiver (such as to cause the audio perceived by the receiver to be perceived as coming from a predetermined location or distance, to modify a frequency spectrum of the audio, to synchronize the audio with the light field image or frame, etc.), to modify a focus of the lightfield image (e.g., based on depth data), and/or otherwise processing the auxiliary dataset(s).

Transmitting the one or more views S500 functions to provide the views (e.g., processed images, selected images, raw images, difference views, key points, primary views, secondary views, etc.) to the display subsystem. S500 is preferably performed after S400, but can be performed at the same time as and/or before S400 (e.g., where the display subsystem can generate and/or select views to be displayed). The views are preferably transmitted using the communicable connection, but can be transmitted in any manner.

In variants, only views that will be displayed to or perceived by a user (e.g., views that are selected and/or captured based on the display user parameters, views corresponding to a left and right eye of a display user, buffer views, primary views, secondary views, etc.) are transmitted. For instance, the set of transmitted (or generated) views can exclude images acquired by cameras of the camera array associated with a camera pose that differs from the eye poses by at least a threshold amount (e.g., a threshold distance, a threshold number of cameras between an excluded camera and a primary or secondary camera, etc.). However, all or any subset of views can be transmitted. The views are preferably transmitted from the image capture subsystem (e.g., a communication module of the image capture subsystem) to the display subsystem (e.g., a communication module of the display subsystem), but can be transmitted between any systems.

In variants, particularly but not exclusively where the image is segmented (such as into key points), transmitting the one or more views can include transmitting a reference image (e.g., reference light field image) of the subject and/or scene. The reference image can be transmitted once (e.g., at a first time point such as when the method is first initiated, during S100, etc.), with each set of key points, randomly, when a threshold change in the reference image occurs (e.g., number of subjects changes, reference image is no longer representative of the subject, etc.), at predetermined times or frequencies, and/or with any suitable timing or frequency.

S500 can include transmitting auxiliary dataset(s). The auxiliary dataset(s) can be transmitted in the same container as the views (e.g., as metadata, embedded in the views, etc.) and/or in a separate container.

Displaying the received views S600 functions to display the received views to the display user. Displaying the received views is preferably performed by the display subsystem (e.g., a lightfield display) requesting the views (e.g., tracking the first user), but can be performed by any system. The views can be directed to a user, displayed within a viewcone of the display, and/or otherwise be displayed. In specific examples, the views can be displayed in a similar manner as the display operation as disclosed in U.S. patent application Ser. No. 16/374,955 titled 'SUPERSTEREOSCOPIC DISPLAY WITH ENHANCED OFF-ANGLE SEPARATION' filed 4 Apr. 2019, U.S. Pat. No. 10,241,344 titled 'ADVANCED RETROREFLECTING AERIAL DIS- PLAYS' filed 28 Nov. 2018, U.S. patent application Ser. No. 17/326,857 filed 21 May 2021 titled 'SYSTEM AND METHOD FOR HOLOGRAPHIC IMAGE DISPLAY,' and/or U.S. patent application Ser. No. 17/332,479 filed 27 May 2021 titled 'SYSTEM AND METHOD FOR HOLOGRAPHIC DISPLAYS,' each of which is incorporated in its entirety by this reference, and/or otherwise be displayed.

S600 can include processing the views (e.g., using a computing system of the display subsystem). Processing the views to be displayed can include formatting the views to be displayed (e.g., lenticularizing or arranging the views as disclosed in U.S. patent application Ser. No. 17/226,404 filed 9 Apr. 2021 entitled 'SYSTEM AND METHOD FOR GENERATING LIGHT FIELD IMAGES' incorporated in its entirety by this reference), modifying a focus of the lightfield image, applying augmentation content (e.g., digital content) to the lightfield image, modifying a reference image (e.g., updating a reference image based on a set of key points), decompressing the views (e.g., using a codex, using a decoder, etc.), and/or otherwise processing the views.

S600 can include presenting auxiliary data. For example, audio datasets can be presented to the users (e.g., receivers). The audio datasets can be presented using a single channel (e.g., mono) and/or a plurality of channels (e.g., stereo). In some variants, the audio data can be modified or processed. For instance, the audio dataset can be presented as a three dimensional or dynamic audio signal that is perceivable as changing a direction and/or other quality (e.g., frequency, loudness, etc.) as a subject moves. However, the audio can be presented as a static signal (e.g., content is presented as it is recorded by the image capture subsystem or sensor thereof) and/or as any suitable signal.

For the sake of clarity, the method is described between two systems (e.g., two communication systems, a display subsystem and an image capture subsystem, etc.). However, the steps and/or substeps of the method may be applied (e.g., simultaneously, contemporaneously, in series, in parallel, etc.) for any number of users and/or systems (e.g., display subsystems, image capture subsystems, communication systems, etc.). The total number of systems (and/or users) can be bounded by a threshold (for example, based on a computing system of associated with a display, on a computing system associated with an image capture subsystem, based on a bandwidth of a computing system, etc.; a threshold number of users that can be tracked simultaneously; a threshold number of users based on the number of views that can be displayed; etc.), but the total number of displays (and/or users) can be unbounded.

5. Illustrative Examples

In an illustrative example as shown in FIG. 5A, a method for lightfield communication can include: establishing a communicable link between a first display subsystem associated with a first user and a second image capture subsystem associated with a second user; determining a user parameter (e.g., user pose, user eye pose, gaze tracking, selected view indices, etc.) associated with the first user; transmitting the user parameter to the second image capture subsystem; acquiring images using the second image capture subsystem based on the user parameter, where at least a subset of the images that are acquired correspond to the user parameter; optionally, processing the images (e.g., cropping the images, aligning the images, rendering the images, reprojecting the images, etc.); transmitting the images to the first display subsystem; and displaying the images at the first display subsystem. The process can be repeated for a second user using a second display subsystem (connected to the second image capture subsystem) and a first image capture subsystem (connected to the first display subsystem) to enable bidirectional communication. The user parameter can be automatically determined by the first display subsystem or first image capture subsystem (e.g., based on a user pose relative to the respective subsystem). The images corresponding to the user parameter can be determined by the first display subsystem or by the second display subsystem (e.g., by mapping the user parameter to a set of cameras).

In a related example as shown in FIG. 5B, the second communication system can capture images at each camera of the second communication system, select a subset of the images based on the first user parameter, and transmit the subset of the images.

In variations of these examples, an eye tracking module can be used to track the viewer(s) (e.g., eye position, gaze, etc. thereof). The eye tracking module can include a processor (e.g., separate from the display or image acquisition processor, integrated with the display or image acquisition processor, etc.) configured to determine at least one of an eye position or an eye vector of the one or more viewers based on one or more tracking images. In variants, the processor can additionally or alternatively estimate and/or predict a location of the viewer(s) (e.g., by performing dead reckoning relative to previous tracked positions) and/or otherwise function. The tracking image(s) can be acquired using the camera array, a dedicated tracking sensor (e.g., a camera that is separate from the camera array), a depth camera, and/or any suitable tracking sensor.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A holographic communication device operable to communicate with one or more communication systems, the holographic communication system comprising:
    a first camera array configured to sample images of a scene;
    a holographic display mounted proximal the camera array;
    an eye tracking module configured to track an eye position of a user proximal the holographic display;
    a second camera array, distal from the first camera array, that is configured to capture images of a second scene based on the eye position, wherein the images of the second scene are perceivable as a holographic image when displayed by the holographic display; and
    a processor configured to segment images of the second scene into a foreground and a background, wherein segmenting the images comprises segmenting a first subset of images using a neural network, wherein the segments of the first subset of images are used to segment a second subset of images based on a difference in camera pose between a camera associated with the first subset of images and a camera associated with the second subset of images, wherein the foreground of the second subset of images are transmitted to the holographic display.

2. The holographic communication device of claim 1, wherein the second camera array comprises a primary camera with a position that approximates an eye position of a virtual viewer proximal the second camera array.

3. The holographic communication device of claim 2, wherein the second camera array comprises a secondary camera, adjacent to the primary camera, wherein the secondary camera is configured to acquire images at a greater frame rate than the primary camera.

4. The holographic communication device of claim 1, wherein the second camera array is a two dimensional array.

5. The holographic communication device of claim 4, wherein the second camera array comprises more columns than rows of cameras.

6. The holographic communication device of claim 1, wherein the second camera array comprises at least 45 cameras.

7. The holographic communication device of claim 1, wherein the eye tracking module comprises the processor is further configured to determine at least one of an eye position or an eye vector of the one or more viewers based on a tracking image.

8. The holographic communication device of claim 7, wherein the eye tracking module comprises a depth camera that is configured to acquire the tracking image.

9. The holographic communication device of claim 1, wherein the holographic display comprises:
  a light source;
  a lenticular lens optically coupled to the light source that, with the light source, generates a light output having viewing angle dependency; and
  an optical volume optically coupled to the lenticular lens;
wherein the light source transmits the light output to the optical volume; wherein the optical volume transmits the light output to free-space.

10. A method comprising:
  determining an eye pose for each eye of one or more viewers of a holographic display;
  transmitting the eye poses to a camera array;
  generating a set of views based on the eye poses of the one or more viewers;
  segmenting views of the set of views into a foreground and a background, wherein segmenting the views comprises segmenting a first subset of views using a neural network, wherein the segments of the first subset of views are used to segment a second subset of views based on a difference in camera pose between a camera associated with the first subset of views and a camera associated with the second subset of views, wherein transmitting the set of views comprises transmitting the foreground of the second subset of views;
  transmitting the set of views to the holographic display, comprising transmitting the foreground of the second subset of views; and
  displaying the set of views using a display of the holographic display, wherein the set of views are perceived as a holographic image by the one or more viewers.

11. The method of claim 10, wherein generating the set of views comprises:
  determining a subset of cameras of the camera array based on the eye poses; and
  acquiring the set of views using only the subset of cameras.

12. The method of claim 10, wherein generating the set of views comprises:
  acquiring a set of images using the camera array;
  selecting the set of views from the set of images based on the received eye poses and a camera pose of each camera of the camera array.

13. The method of claim 12, further comprising compressing the set of views, wherein the compressed views are transmitted, wherein a primary view of the set of views is compressed with a higher fidelity than a secondary view of the set of views, wherein the primary view is acquired by a camera with a pose closer to the eye pose of one or more viewers than the secondary view.

14. The method of claim 12, wherein the set of views excludes images acquired by cameras of the camera array associated with a camera pose that differs from the eye poses by at least a threshold amount.

15. The method of claim 10, further comprising interpolating between views of the set of views based on a pose of an associated camera relative to the eye poses.

16. The method of claim 10, wherein the set of views are transmitted without generating a three dimensional representation from the set of views.

17. The method of claim 10, wherein the set of views are arranged as a quilt image, wherein the quilt image is displayed by the holographic display.

18. The method of claim 10, further comprising:
  receiving audio data measured by a microphone proximal the camera array; and
  playing the audio data at a speaker proximal the display, wherein the audio data is synchronized with the displayed holographic image.

* * * * *